Nov. 24, 1970 M. B. VERRIJP 3,541,680
METHOD OF MANUFACTURING SUPERCONDUCTING MATERIAL
Filed Nov. 28, 1967
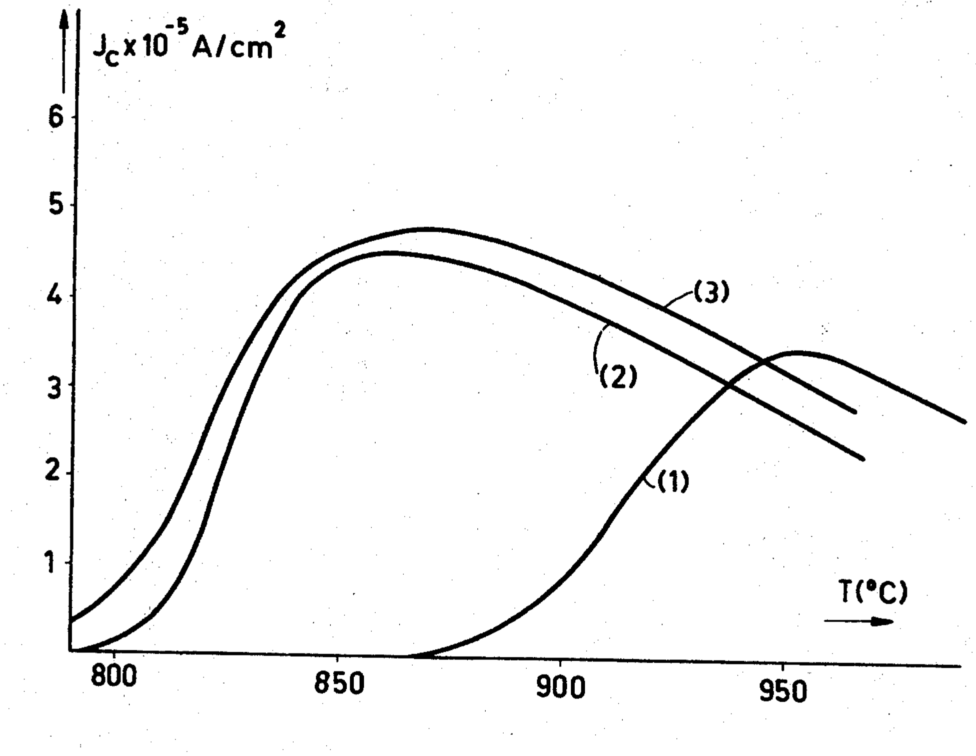
INVENTOR.
MAARTEN B. VERRIJP
BY
Frank R. Trifari
AGENT

United States Patent Office 3,541,680
Patented Nov. 24, 1970

3,541,680
METHOD OF MANUFACTURING SUPERCONDUCTING MATERIAL

Maarten Bastiaan Verrijp, Emmasingel, Eindhoven, Netherlands, assignor to U.S. Philips Corporation, New York, N.Y., a corporation of Delaware Filed Nov. 28, 1967, Ser. No. 686,275
Claims priority, application Netherlands, Dec. 30, 1966, 6618394
Int. Cl. H01v 11/00
U.S. Cl. 29—599 4 Claims

ABSTRACT OF THE DISCLOSURE

A method of manufacturing $Nb_3Sn$ in which a mixture of niobium and tin are mechanically processed into a desired shape and then heated to a temperature between 700° and 930° C. in the presence of a metal which inhibits the formation of Nb-Sn compounds other than $Nb_3Sn$.

The present invention relates to a method of manufacturing superconducting material containing the compound $Nb_3Sn$ as the active constituent.

The superconducting properties of $Nb_3Sn$ are known. $Nb_3Sn$ has a high critical magnetic field strength, a high value of the critical current and a high critical temperature (18° K.). Due to its considerable brittleness the processability of this material is unfortunately limited. Treatment during manufacture of bodies from this material must be carried out with care. In addition prolonged thermal treatments at a high temperature are required.

To manufacture a superconducting wire with $Nb_3Sn$ as the active constituent it is therefore suggested, for example, to subject a tube filled with a mixture of pulverulent niobium and tin to a mechanical reduction operation and subsequently to a thermal treatment at a temperature between 800° C. and 1500° C. for a period of between 5 and 25 hours.

It has been possible to achieve an improvement of the critical current density by starting from powder having a smaller grain size. As a result the time of treatment is also considerably shortened so that it is sometimes difficult to accurately observe the optimum times of heating, particularly when large quantities of material must be heated simultaneously.

The invention provides a new method of manufacturing $Nb_3Sn$ having improved superconducting properties and the manufacturing conditions of which have also been greatly improved.

According to the invention in the method of manufacturing superconducting material, which contains the compound $Nb_3Sn$ as the active constituent which is obtained by jointly heating metallic starting materials containing niobium or tin, within the temperature range between 700° C. and 930° C., the starting materials and the $Nb_3Sn$ formed are in contact with one or more of the elements Cu, Ag, Au, Pt, or Pd during the reaction or during the subsequent cooling.

In one preferred embodiment the known method is used in which a mixture of niobium and tin powder is present in a casing which is drawn tothe desired diameter and, if desired, wound to a coil prior to heating being carried out to form the compound $Nb_3Sn$, a quantity between 0.2 and 15 at. percent of pulverulent Cu, Ag, Au, Pt, or Pd being added according to the invention to the mixture of niobium and tin.

When judging the superconducting properties of a material, the critical current strength is particularly important. The critical current strength is to be understood to mean the maximum value of the current which can flow through the material without altering its superconducting condition. For a wire having given dimensions, the critical current strength ($I_c$) depends on the magnetic field strength (H) of the wire. As an approximation, the product $H \times I_c$ is constant for the compound $Nb_3Sn$.

The invention will be described with reference to the drawing in which the sole figure shows the relationship of the critical current densities to the temperature of heating of the starting material. These curves were measured at A' magnetic field strength of 50,000 Oe. and a temperature of 4.2° K.

When using the known method of manufacturing $Nb_3Sn$ wire in which a mixture of compressed Nb and Sn powder is heated, $Nb_3Sn$ is obtained of which the critical current density measured at 4° K. passes through a maximum as a function of the period of heating. The optimum peried of heating is dependent on the reaction temperature and the grain size of the niobium used. The maximum current density obtained during the optimum period of heating which can be passed at 4° K. through the $Nb_3Sn$ is also dependent on the grain size of the niobium. In the case of a smaller grain size the critical current density strongly increases. The influence of the temperature within the range between 930° C. and 1100° C. is, however, only small. Below 930° C. the maximum critical current density to be achieved decreases comparatively rapidly and the required periods of heating become disproportionally long. Curve 1 in the figure shows a typical behavior of the critical current density ($J_c$) reached as a function of the temperature after a period of heating of 30 minutes. This curve applies to starting material with niobium powder having a grain size smaller than 10$\mu$. The cause of this deviating behavior below 930° C. is the possibility of the formation of the compound $Nb_6Sn_5$ which strongly inhibits the formation of $Nb_3Sn$. Also a third compound ($NbSn_2$) may be formed below 850° C.

In the tests which led to the present invention it was found that addition of Cu, Ag, Au, Pt, or Pd makes it impossible to form the compound $Nb_6Sn_5$ at a temperature which is higher than approximately 800° C. The formation of the compound $NbSn_2$ is suppressed at temperatures higher than approximately 700° C. The result is illustrated by the curves 2 and 3 in comparison with curve 1 in the figure.

Addition of 2 at. percent of Pd or Cu to the starting material, (curves 2 and 3 respectively) yields a product with very high critical current densities at temperatures at which substantially no $Nb_3Sn$ is formed without the addition. The other additions show substantially identical results. The measured values all applied to a heating period of 30 min. at the relevant temperature and the measurements were carried out at 4° K. and a magnetic field strength of 50,000 Oe. If the period of heating is chosen to be different then the variation of the curves changes to some extent analogous to the described example of the wire without addition of one of those elements.

Besides this direct possibility of achieving higher current densities the addition according to the invention also provides the possibility of an improvement in quality through better control of the thermal treatment of mixtures of fine powders in the wires according to a preferred embodiment. The use of fine powders is to be preferred because as a result thereof it is possible to obtain very much higher critical current densities. For powders having a grain size between 5 and 10$\mu$ the optimum period of heating is however, only a few minutes at approximately 950° C. and for powders having a smaller grain size this is still much shorter. Particularly, when large quantities of material are to be heated at the same time, it is impossible to realize the optimum period of heating for the whole batch. By using the invention it is, however, possible to heat for longer periods of time at lower temperatures. Each decrease by 20° C. to 30° C. results in a duplication of the period of heating.

A third aspect of the invention is that the $Nb_3Sn$ which is formed during heating is less sensitive to the rate of cooling after the reaction. If there is an excess of tin present this reacts with the $Nb_3Sn$ during cooling while forming compounds which are richer in tin. This decreases the critical current in the superconducting condition. Since with the alloys obtained according to the invention the temperatures are lower at which the compounds richer in tin can only be formed, the influence of these reactions has strongly decreased.

In the preferred embodiment it is preferrable not to use an excess of tin. In fact, it is, however, possible that an excess of tin is locally produced due to insufficient mixture of the starting materials or of irregularities in the drawing process. This gives rise to weak areas in the wire if it is not sufficiently rapidly cooled after the reaction. The invention provides an obvious improvement in this case. This improvement is very obvious also in the known method in which Nb-tape is immersed in molten tin, $Nb_3Sn$ being formed on the surface of the tape. Since it is desirable to maintain a layer of tin on the surface of this tape because of its solderability to a copper layer, if desired, there is also in this case the risk that the $Nb_3Sn$ will decompose during cooling. A reaction with tin in which one of the said elements is dissolved appears to have obvious advantages in this respect.

The additions according to the invention may of course also be included in the reaction of niobium with tin in a different manner. For example, the casing material may be chosen to be such that a certain percentage of the relevant element in the tin melted during the reaction dissolves from the casing. Although the concentration gradient of the dissolved casing material in the core then gives rise to difficulties, these can readily be obviated by providing the core also with the relevant metal in pulverulent form. In such cases other of said elements may also be added to the starting material.

With all these possibilities it should be ensured that the percentage of Cu, Ag, Au, Pt, or Pd in the niobium-tin does not become too high since otherwise considerable quantities of nonsuperconducting compounds are formed which seriously inhibit the passage of current. In general, alloy percentages of up to 5 at. percent do not have noticeably harmful influences. However, above 10 at. percent the critical current density has generally decreased below acceptable values if the content of tin remains unchanged. If the content of tin is increased alloy percentages of up to 15% may be acceptable.

The grain size of the niobium is generally of great importance in the preferred embodiment. As the grain size is smaller the values achieved of the critical current density are higher. This remains true when one of the said five elements is present during the reaction.

If an alloy is chosen as a casing material it should be taken into account that elements may occur therein which may fully or partly bring to nought the improvement achieved by the invention. Examples of such elements are chromium and iron.

The invention will now be described with reference to two illustrative embodiments.

EXAMPLE 1

Three niobium tubes having an inside diameter of 5 mm. and an outside diameter of 8 mm. were filled with different powder mixtures containing in atomic percent: 74 Nb, 2 Pd and 23 Sn; 75 Nb, 2 Cu and 23 Sn; 75 Nb and 25 Sn, respectively. The niobium had a grain diameter below 10$\mu$, the Cu and Pd below 50$\mu$. The filled tubes were processed to wire of 1.3 mm. by hammering. The section of the core then had a surface area of 0.20 mm.$^2$. The critical currents were measured at 50,000 Oe. and a temperature of 4.2° K. An optimum critical current—700 A.—for the wire having 75 Nb, 25 Sn was achieved after heating at 960° C. for 6 min. A critical current of 970 A. was already achieved after 0.5 hour at 850° C. for the wire having 2% of Cu, and 950 A. for the wire having Pd. Similar results were obtained for wires having Ag, Au, or Pt. For comparison it is noted that the wire without addition did not show superconductance after heating at 850° C. for 0.5 hour.

EXAMPLE 2

A niobium tape having a width of 2 mm. and a thickness of 20$\mu$ was passed in vacuo through a bath of molten tin at 960° C. at a rate of 20 mm./min. The total length of the region of reaction was 300 mm. so that the stay of 960° C. was 15 min. The tape cooled in a temperature gradient of approximately 7° C./mm. so that the rate of cooling was 140° C. per min. A second tape was treated in an identical manner with the exception that 6 at. percent of Cu was dissolved in the bath of molten tin. The measurement of the critical currents of the $Nb_3Sn$ formed on the surface of the niobium tape was again carried out at 4.2° K. in a field of 50,000 Oe. To obtain a mean value, 8 preparations of either tape were measured in parallel arrangement. For the first test this yielded a critical current of 188 A. The tapes from the tin bath containing copper reached, however, 270 A. That a cooling effect was concerned appeared from the fact that the effect was absent in preparations which had been cooled at a rate of more than 500° C. per minute.

While the invention has been described with reference to specific embodiments other modifications will be apparent to those skilled in the art without departing from the spirit and scope of the invention which is defined in the appended claims.

What is claimed is:

1. A method of manufacturing superconducting material containing the compound $Nb_3S_n$ as the active constituent comprising the steps, forming a three component mixture in elemental form of niobium, tin and from 0.2 to 15 atomic percent of an element selected from the group consisting of Cu and Pd, heating said mixture within a temperature range between 700° C. and 930° C. and thereafter cooling the reaction product.

2. The method of claim 1 wherein the three component mixture is placed in a casing which is drawn to the desired diameter prior to heating.

3. A method as claimed in claim 2, in which 2 atomic percent of Cu is present.

4. A method as claimed in claim 2, in which 2 atomic percent of Pd is present.

References Cited

UNITED STATES PATENTS

| | | | |
|---|---|---|---|
| 3,196,532 | 7/1965 | Swartz et al. | |
| 3,218,693 | 4/1965 | Allen et al. | 29—599 |
| 3,256,118 | 6/1966 | Speidel. | |
| 3,325,888 | 6/1967 | Weinig et al. | 29—194 |
| 3,358,361 | 12/1967 | Kolbe | 29—599 |

OTHER REFERENCES

Superconductivity in $Nb_3Sn$ at High Current Density in a Magnetic Field of 88 k. gauss, by Kunzler et al., Feb. 1, 1961 Physical Review Letters, vol. 6, No. 3, pp. 89–91.

JOHN F. CAMPBELL, Primary Examiner
W. TUPMAN, Assistant Examiner

U.S. Cl. X.R.

29—420; 148—2